(12) United States Patent
Grechanik et al.

(10) Patent No.: US 8,856,190 B2
(45) Date of Patent: Oct. 7, 2014

(54) DISTRIBUTED COMPUTING SYSTEM HIERARCHAL STRUCTURE MANIPULATION

(75) Inventors: Mark Grechanik, Chicago, IL (US); Chen Fu, Lisle, IL (US)

(73) Assignee: Accenture Global Services Limited, Dublin (IE)

( * ) Notice: Subject to any disclaimer, the term of this patent is extended or adjusted under 35 U.S.C. 154(b) by 204 days.

(21) Appl. No.: 13/174,193

(22) Filed: Jun. 30, 2011

(65) Prior Publication Data

US 2013/0007065 A1 Jan. 3, 2013

(51) Int. Cl.
*G06F 7/00* (2006.01)
*G06F 17/30* (2006.01)

(52) U.S. Cl.
CPC .............................. *G06F 17/30908* (2013.01)
USPC ........................................................ 707/802

(58) Field of Classification Search
USPC .................................. 707/802, 602, 999.103
See application file for complete search history.

(56) References Cited

U.S. PATENT DOCUMENTS

| | | | | |
|---|---|---|---|---|
| 5,734,907 A * | 3/1998 | Jarossay et al. | ............... | 717/141 |
| 5,987,506 A * | 11/1999 | Carter et al. | .................... | 709/213 |
| 8,196,112 B1 * | 6/2012 | Cansizlar | ...................... | 717/126 |
| 2001/0047372 A1 * | 11/2001 | Gorelik et al. | ................ | 707/514 |
| 2002/0156702 A1 * | 10/2002 | Kane | ................................ | 705/27 |
| 2005/0050525 A1 * | 3/2005 | Chittar et al. | ................. | 717/136 |
| 2005/0102685 A1 * | 5/2005 | Hariharan et al. | ............. | 719/328 |
| 2006/0070043 A1 * | 3/2006 | Viega et al. | .................... | 717/136 |
| 2007/0174812 A1 * | 7/2007 | Yang | ............................. | 717/114 |
| 2007/0260582 A1 * | 11/2007 | Liang | ................................ | 707/2 |
| 2009/0144322 A1 * | 6/2009 | Aridor et al. | ............... | 707/103 Y |
| 2009/0248624 A1 * | 10/2009 | Lammel et al. | .................... | 707/3 |
| 2010/0050152 A1 * | 2/2010 | Gilboa | ........................... | 717/106 |
| 2010/0275182 A1 * | 10/2010 | Marfatia et al. | ............... | 717/110 |
| 2010/0332818 A1 * | 12/2010 | Prahlad et al. | ................. | 713/150 |
| 2011/0131250 A1 * | 6/2011 | Stolte et al. | .................... | 707/802 |
| 2012/0131561 A1 * | 5/2012 | Spiess et al. | .................... | 717/140 |
| 2012/0233668 A1 * | 9/2012 | Leafe et al. | ......................... | 726/4 |

OTHER PUBLICATIONS

Batory, D., B. Lofaso, and Y. Smaragdakis "JTS: Tools for Implementing Domain-Specific Languages". 5th International Conference on Software Reuse, Victoria, Canada, Jun. 1998.

Wang, D., A. Appel, J. Korn, and C. Serra. "The Zephyr Abstract Syntax Description Language". Proceedings of the Conference on Domain-Specific Languages, Oct. 1997.

Liu, Z., "An Advanced C++ Library for Symbolic Computing". Technical Report TR-CIS-0299-11, Department of Computer and Information Science, Indiana University Purdue University Indianapolis, 1999.

MKS Lex and Yacc Product Reference. http://www.mkssoftware.com/products/ly/.2001.

(Continued)

*Primary Examiner* — Mohammed R Uddin
(74) *Attorney, Agent, or Firm* — Mannava & Kang, P.C.

(57) ABSTRACT

A hierarchal structure manipulation system may include a nested table generation module to generate nested tables representing hierarchal relationships of computing systems in a distributed computing environment. A hierarchal structure manipulation module may access at least one nested table to manipulate a hierarchal structure represented by the nested table. The hierarchal structure manipulation module may use a generic algebraic specification to manipulate the hierarchal structure represented by the nested table. The generic algebraic specification may provide a generic abstraction across a plurality of the computing systems in the distributed computing environment.

18 Claims, 24 Drawing Sheets

(56) References Cited

OTHER PUBLICATIONS

Crew, R., "ASTLOG: A Language for Examining Abstract Syntax Trees". Proceedings of the Conference on Domain-Specific Languages, Oct. 1997.

Badros, G., "JavaML: A Markup Language for Java Source Code". Ninth International World Wide Web Conference, 2000.

Widemann, B., M. Lepper, J. Wieland, and P. Pepper. "Automized Generation of Typed Syntax Trees via XML". Proceedings of the XSE Workshop, 2001.

Levene, M. and P. Wood. "XML Structure Compression". Birkbeck College, Universitty of London, 2002.

Hors, A., P. Hegaret, L. Wood, G. Nicol, J Robie, M. Champion, S. Byrne. "Document Object Model (DOM) Level 2 Core Specification Version 1.0". W3C Recommendation <http://www.w3.org/TR/2000>.

Grechanik, Mark; Perry, Dewayne E.; Batory, Don; Lavender, Greg R. "XML-based Intermediate Representation (XIR)", UT Center for Advanced Research in Software Engineering (UT ARISE), University of Texas at Austin. May 2002.

* cited by examiner

```
<Expression>X * (Y + 6/Z)
  <multiply>45.000000
          <Identifier Name="X" Value="5.000000"/>
          <sum>9.000000
                <Identifier Name="Y" Value="7.000000"/>
                <divide>2.000000
                    <Number Value="6.000000"/>
                    <Identifier Name="Z" Value="3.000000"/>
                </divide>
          </sum>
  </multiply>
</Expression>
```

FIG. 4

```
Main()
{
  Initialize DOM programming environment
  Create an XML document
  Load an XML file
  Get a handle to the top node Expression
  If CheckValues(handle) == FALSE then
        Print "There are missing values"
  End If
  Release all handles
  Close XML file
}

BOOLEAN CheckValues( handle )
{
  Retrieve the collection of all nodes under the given handle
  For each node in the collection do
  {
        Get the name and handle of the current node
        If name is either "Identifier" or "Number" then
              Get the collection of all attribute nodes named "Value"
              If this collection is empty then
                    Return FALSE
              END IF
        Else
              If CheckValues(handle of the current node) = FALSE
                    Return FALSE
              End If
        End If
  }
  Return TRUE
}
```

FIG. 5

```
Main Program
BEGIN
  xml << "XML Data"
  If CheckValues( xml["Expression] ) = FALSE then
          Print "Missing value"
  End If
END BOOLEAN CheckValues( node )
  BEGIN
    NodeCount <- node
    Loop counter < NodeCount do
            If node[counter] = "Identifier" OR node[counter] = "Number" then
                    AttributeCount <- node[counter]("Value")
                    If AttributeCount = 0 Then
                            Return FALSE
                    End If
            Else
                    If CheckValues(node[counter]) = FALSE
                            Return FALSE
                    End If
            End If
    End Loop
    Return TRUE
  END
```

FIG. 6

```
public class ExpressionVerifier
{
    private boolean CheckValues( REF XmlObject node )
    {
        int counter = -1;
        while( node > ++counter )
        {
            if(node[counter] == "Identifier" || node[counter] == "Number")
            {
                if( node[counter]("Value") == 0 )
                    return( false );
            }
            else
            {
                if( CheckValues(node[counter]) == false )
                    return( false );
            }
        }
        return( true );
    }
    public static void main()
    {
        XmlObject xml;
        string xmlData;
        //load the string with XML data
        xml << xmlData;
        if( CheckValues(xml["Expression"]) == false )
        {
            System.Out.println( "Missing values" );
        }
    }
}
```

FIG. 7

```
template <class T> class HSMLGenericAccess
{
//constructor and destructor
public:
   inline HSMLGenericAccess( void );
   inline HSMLGenericAccess( const HSMLGenericAccess <T>&haObject );
   inline HSMLGenericAccess( const HSMLGenericAccess <T>*haObject );
   inline virtual ~HSMLGenericAccess( void );

//operators
public:
   inline HSMLGenericAccess<T> &operator=( const HSMLGenericAccess<T> &node );
   inline HSMLGenericAccess<T> &operator=( const HSMLGenericAccess<T> *node );

inline T *operator->( void ) const;

//node retrieval operators
   inline HSMLGenericAccess<T> &operator[] ( int n );
  inline HSMLGenericAccess<T> &operator[] ( const string &strName );

//attribute retrieval operators
   inline HSMLGenericAccess<T> &operator() ( void );
   inline HSMLGenericAccess<T> &operator() ( int n );
   inline HSMLGenericAccess<T> &operator() ( const string &strName );

inline HSMLGenericAccess<T> &operator+ ( HSMLGenericAccess<T> &node );
   inline HSMLGenericAccess<T> &operator+= ( HSMLGenericAccess<T> &node );
   inline HSMLGenericAccess<T> &operator+= ( HSMLGenericAccess<T> *node );
   inline HSMLGenericAccess<T> &operator+= ( const string &childElemName );
   inline HSMLGenericAccess<T> &operator-= ( const string &strName );
   inline HSMLGenericAccess<T> &operator-= ( const int &nIndex );
```

FIG. 8

```
inline bool operator> ( int nValue );
inline bool operator>= ( int nValue );
inline bool operator< ( int nValue );
inline bool operator<= ( int nValue );
inline bool operator== ( int nValue );
inline bool operator!= ( int nValue );
inline bool operator> ( string strValue );
inline bool operator>= ( string strValue );
inline bool operator< ( string strValue );
inline bool operator<= ( string strValue );
inline bool operator== ( string strValue );
inline bool operator!= ( string strValue );

inline HSMLGenericAccess<T> &operator<< ( const string &strData );
inline HSMLGenericAccess<T> &operator<< ( const char *pData );
inline HSMLGenericAccess<T> &operator<< ( const int nData );
inline HSMLGenericAccess<T> &operator<< ( const unsigned int nData );
inline HSMLGenericAccess<T> &operator<< ( const long nData );
inline HSMLGenericAccess<T> &operator<< ( const float fData );
inline HSMLGenericAccess<T> &operator<< ( const double eData );
inline HSMLGenericAccess<T> &operator<< ( const bool bData );

inline HSMLGenericAccess<T> &operator>> ( string &strData );
inline HSMLGenericAccess<T> &operator>> ( int &nData );
inline HSMLGenericAccess<T> &operator>> ( float &fData );
inline HSMLGenericAccess<T> &operator>> ( double &eData );
inline HSMLGenericAccess<T> &operator>> ( bool &bData );
inline HSMLGenericAccess<T> &operator>> ( char *pData );
inline HSMLGenericAccess<T> &operator>> ( char **ppData );
inline HSMLGenericAccess<T> &operator>> ( unsigned int &nData );
inline HSMLGenericAccess<T> &operator>> ( long &nData );

protected:
 T *m_pT;
};
```

FIG. 8
(continued)

```
inline HSMLGenericAccess<T> &operator[] ( int n );
inline HSMLGenericAccess<T> &operator[] ( const string &strName );
inline HSMLGenericAccess<T> &operator() ( int n );
inline HSMLGenericAccess<T> &operator() ( const string &strName );
```

FIG. 9

```
<A>
        <B/>
        <C>
                <D Type="class">1</D>
                <D Type="struct">2</D>
                <D Type="struct">1</D>
                <D Type="struct">1</D>
                <D Type="struct">1</D>
                <E/>
        </C>
</A>
```

FIG. 10

```
<A>
    <B/>
        <D Type="struct">1</D>
        <D Type="struct">1</D>
        <D Type="struct">1</D>
    <C>
        <D Type="class">1</D>
        <D Type="struct">2</D>
        <E/>
    </C>
</A>
```

FIG. 11

```
HSMLGenericAccess<XML> x, d; //declare two objects
x << xmlUrl;       //load the original XML data contained in xmlUrl
                   //string.
d = x["A"]["C"]["D"]; //navigate to the collection of D nodes
int i = 0; //initialize the counter
while( d > i )     //check to see if there are still D nodes in the
                   //collection. Operator >is overloaded to get
                   //the count of all current nodes in d object and
                   //compare it with integer i
{
      int Value; //temporary variable to keep the value of a D node
      string AttrValue;  //temporary variable to keep the value of a D
                         //node "Terminal" attribute
      d[i] >> Value;              //get the value of D node
      d[i]("Type") >> AttrValue;    //get the value of D node attribute
      if( 1 == Value && AttrValue == "struct")
      {
            x["A"]["B"] += d[i];//then move the D node under the B node
      }
      else
            ++i;//otherwise let's process the next node
}
```

FIG. 12

```
([0-9]+|([0-9]*\.[0-9]+)([eE][-+]?[0-9]+)?) {
 double dValue = atof( yytext );
 yylval.pObj = new HSMLGenericAccess<XML>;
 if( yylval.pObj )
 {
     (*(yylval.pObj)) += "Number";
     (*(yylval.pObj))["Number"]() += "Value";
     (*(yylval.pObj))["Number"]("Value") << dValue;
 }
 return( VDOUBLE );
}
 [A-Za-z_][A-Za-z0-9_]*{
 yylval.pObj = new HSMLGenericAccess<XML>;
 if( yylval.pObj )
 {
     (*(yylval.pObj)) += "Identifier";
     (*(yylval.pObj))["Identifier"]() += "Name";
     (*(yylval.pObj))["Identifier"]("Name") <<
yytext;
 }
 return( IDENTIFIER );
 }
```

FIG. 13

```
%union
{
        int iValue;
        HSMLGenericAccess<XML> *pObj;
}
%token <iValue> PARENLEFT PARENRIGHT PLUS MINUS MULTIPLY DIVIDE
%token <pObj> VDOUBLE IDENTIFIER
%left <pObj> PLUS MINUS
%left <pObj> MULTIPLY DIVIDE
%nonassoc UMINUS
%type <pObj> sum minus multiply divide expression
%% program:
        expression= { top = $1; }
|
;

expression:
        VDOUBLE = { $$ = $1; }
|       IDENTIFIER = { $$ = $1; }
|       sum = { $$ = $1; }
|       minus = { $$ = $1; }
|       multiply = { $$ = $1; }
|       divide = { $$ = $1; }
|       PARENLEFT expression PARENRIGHT = { $$ = $2; }
;

sum :
 expression PLUS expression= { $$ = new CXMLObject; *($$) += "sum";
        (*$$)["sum"] += $1; (*$$)["sum"] += $3; }
;

minus:
 expression MINUS expression= { $$ = new CXMLObject; *($$) += "minus";
        (*$$)["minus"] += $1; (*$$)["minus"] += $3; }
;

multiply:
 expression MULTIPLY expression= { $$ = new CXMLObject;
        *($$) += "multiply"; (*$$)["multiply"] += $1;
        (*$$)["multiply"] += $3; }
;

divide:
 expression DIVIDE expression= { $$ = new CXMLObject;
        *($$) += "divide"; (*$$)["divide"] += $1; (*$$)["divide"] += $3;
}
;
```

FIG. 14

```
<divide>
 <Identifier Name="X1"/>
 <multiply>
    <Identifier Name="X2"/>
    <minus>
       <Identifier Name="X3"/>
       <multiply>
          <Number Value="5.110000"/>
          <sum>
             <Identifier Name="X4"/>
             <Number Value="8.000000"/>
          </sum>
       </multiply>
    </minus>
 </multiply>
</divide>
```

FIG. 15

```
void CreateSymbolTree( HSMLGenericAccess<XML> &xmlir, HSMLGenericAccess<XML> &st)
{
 for( int i = 0; xmlir > i; i++ )
 {
        HSMLGenericAccess<XML> branch = xmlir[i];
        if( branch != "Identifier" )
        {
                CreateSymbolTree( branch, st);
        }
        else
        {
                string idName;
                branch("Name") >> idName;14
                if( t[idName] == 0 )
                {
                        double Value;
                        t += idName;
                        cout << "Enter value for variable " << idName << ": ";
                        cin >> Value;
                        t[idName]() += "Value";
                        t[idName]("Value") << Value;
                }
        }
 }
}
```

FIG. 17

Root computer A communicates with either: leased computer B
　　　　　　　　　　　　　　　　　　　　　　OR
　　　　　　　　　　　　　　　　　　　　　　leased computer C  AND leased computer D
leased computer B communicates with processing nodes: e f g
leased computer C communicates with either: leased computer K
　　　　　　　　　　　　　　　　　　　　　　OR
　　　　　　　　　　　　　　　　　　　　　　processing nodes l AND Q
leased computer D communicates with processing nodes : m n o
leased computer K  communicates with processing node : p
leased computer Q communicates with processing node : r s

FIG. 19

```
<f type="class" modifier="public">
        <r type="method" returntype="void">
                <internalvariable1 .../>
                <internalvariable2 .../>
                <internalvariableN .../>
        </r>
</f>
```

FIG. 20

```
Algorithm AggregatedContainmentLevels
 Init
      Create root node SymTable in the symbol table XML
      Set the root node in XMLIR as current node
 End Init Call BuildScopes( current, SymTable )
End Aggregated Containment Levels BuildScopes( XMLIRnodeCollection, ParentScope )
 for each node in XMLIRnodeCollection do
      current <- XMLIR node
      check the containment level flag of current
      if the containment level flag is set then
           check the containment level naming flag of current
           if the naming flag indicates that the containment level is anonymous then
                sname <- generate unique name for the containment level
           else
                nid <- get the id of the child node that contains a
                terminal with the containment level name
                nagivate to the node using nid and retrieve the
                containment level name
                store the name in variable called sname
           end if
           SymTable += sname
           NestedSymTable = SymTable[sname]
           for each child node of current do
                BuildScopes( child, NestedSymTable )
           end for
      end if
 end for
```

FIG. 21

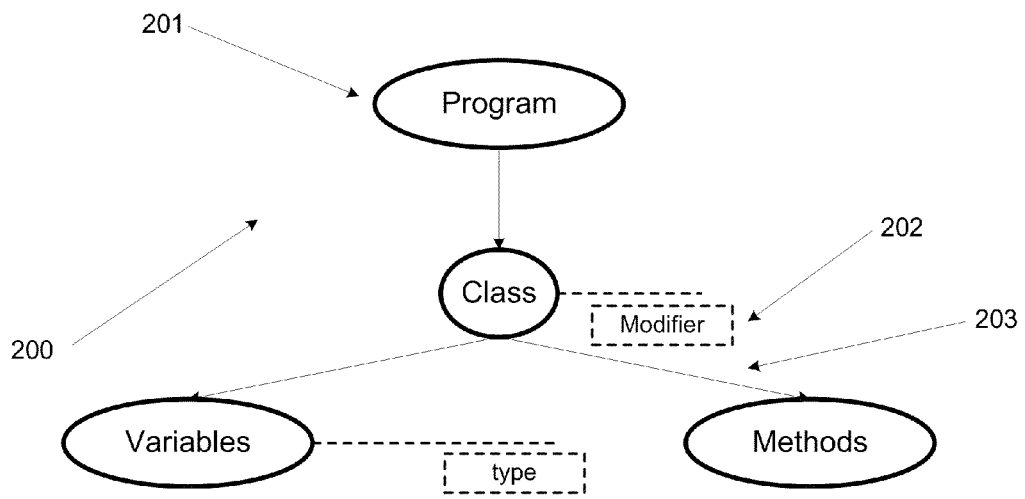

FIG. 22

```
Initialize COM library
Create an XML document
Load an XML file
Retrieve the collection of all nodes with name "Program"
For each node in the collection do
{
        Get the collection of all "Class" nodes
        For each node in the collection do
        {
                Get the collection of all "Variable" nodes
                For each node in the collection do
                {
                        Get attribute named "Identifier"
                        Get value of the retrieved attribute
                }
        }
}
```

FIG. 23

DISTRIBUTED COMPUTING SYSTEM HIERARCHAL STRUCTURE MANIPULATION

BACKGROUND

In distributed computing environments such as cloud computing, users may use multiple server-based computational resources via a network. In such environments and other computing environments generally, hierarchical organizations of data may be represented and manipulated by systems, such as, file systems, database schemas, compilers, eXtensible Markup Language (XML), HyperText Markup Language (HTML), Electronic data interchange (EDI), relational data, any type of user-defined structure, or a proprietary structure a company or organization may use. Application programming interfaces (APIs) may be used to access services. In distributed computing environments, each cloud may have different API calls. Hierarchical data vendors may offer libraries that export API calls that deal with low-level details of hierarchical structure organizations, with such calls being referred to as canonical API calls. These calls are orthogonal and may create a basis for building the next level of functionality. These APIs may be complicated and may have a steep learning curve to master their functionality. The difficulties in using the foregoing libraries are the result of complex interactions among the canonical APIs. For example, in order to access certain elements in a XML tree using Document Object Model (DOM) API, the tree may be loaded in memory and a handle to the structure that represents this tree may be obtained in order to be used in subsequent API calls.

As a result of the complex dependencies among canonical APIs, software can be difficult to write. For example, even though the basic functionality of the MICROSOFT XML API and the XERCES XML API are comparable, their APIs may not be equivalent. This means that if a MICROSOFT implementation is to be replaced with the XERCES implementation, a software rewrite may be needed.

A preliminary step in designing software that manipulates hierarchical data may include writing a requirement specification. The choice of a language for this specification may also be carefully decided. If the chosen language is implementation specific and depends on the compiler used, then it may be difficult to convert such a specification to a different language. Another difficulty may include detection of possible ambiguities in the selected language because of its complex semantics.

Alternatively, if the chosen language is too formal, it may require significant efforts to translate the formal specification into a sequence of algorithmic steps implemented in a particular language. Formal methods may provide a higher level of abstraction than a series of algorithmic steps. However, problems may occur when the impedance mismatch between a formal specification and implementation languages with canonical APIs is significant. In such a case, the high level of abstraction that can be achieved in formal specifications is grounded. Not only can it be difficult to verify the implementation code against the formal specification, it may also be impractical to write a code analyzer that checks various semantic aspects of data manipulation.

BRIEF DESCRIPTION OF DRAWINGS

The embodiments are described with reference to the following figures:

FIG. 4 illustrates an example of an expression represented using a XML tree, according to an embodiment;

FIG. 5 illustrates a specification describing high-level process steps for finding nodes in a XML file and verification of presence of an attribute, according to an embodiment;

FIG. 6 illustrates revised specification shown in FIG. 5 that uses an ASHIES notation, according to an embodiment;

FIG. 7 illustrates an example of a C# class called EXPRESSIONVERIFIER that implements the specification shown in FIG. 6, according to an embodiment;

FIG. 8 illustrates declarations of operators in C++, according to an embodiment;

FIG. 9 illustrates examples of integer and string arguments, according to an embodiment;

FIG. 10 illustrates a XML example to demonstrate HSMLGenericAccess functionality, according to an embodiment;

FIG. 11 illustrates a resulting XML file after performing manipulation over its structure, according to an embodiment;

FIG. 12 illustrates an example of HSML code for performing actions over a XML file, according to an embodiment;

FIG. 13 illustrates an example of LEX specification for calculator expressions, according to an embodiment;

FIG. 14 illustrates an example of YACC grammar for a calculator that uses HSMLGenericAccess to produce XIL, according to an embodiment;

FIG. 15 illustrates an example of XMLIR produced as a result of parsing an arithmetic expression, according to an embodiment;

FIG. 17 illustrates an algorithm for creation of a symbol tree from XIL, according to an embodiment;

FIG. 19 illustrates an example grammar that contains aggregated containment levels, according to an embodiment;

FIG. 20 illustrates an example of a resulting symbol table, according to an embodiment;

FIG. 21 illustrates an algorithm for building a symbol table containing aggregated containment levels from XMLIR, according to an embodiment;

FIG. 22 illustrates schema showing a XML structure that describes a grammar, according to an embodiment;

FIG. 23 illustrates pseudocode describing a set of operations used by MS XML DOM parser to accomplish a task, according to an embodiment;

DETAILED DESCRIPTION OF EMBODIMENTS

Figure 1:
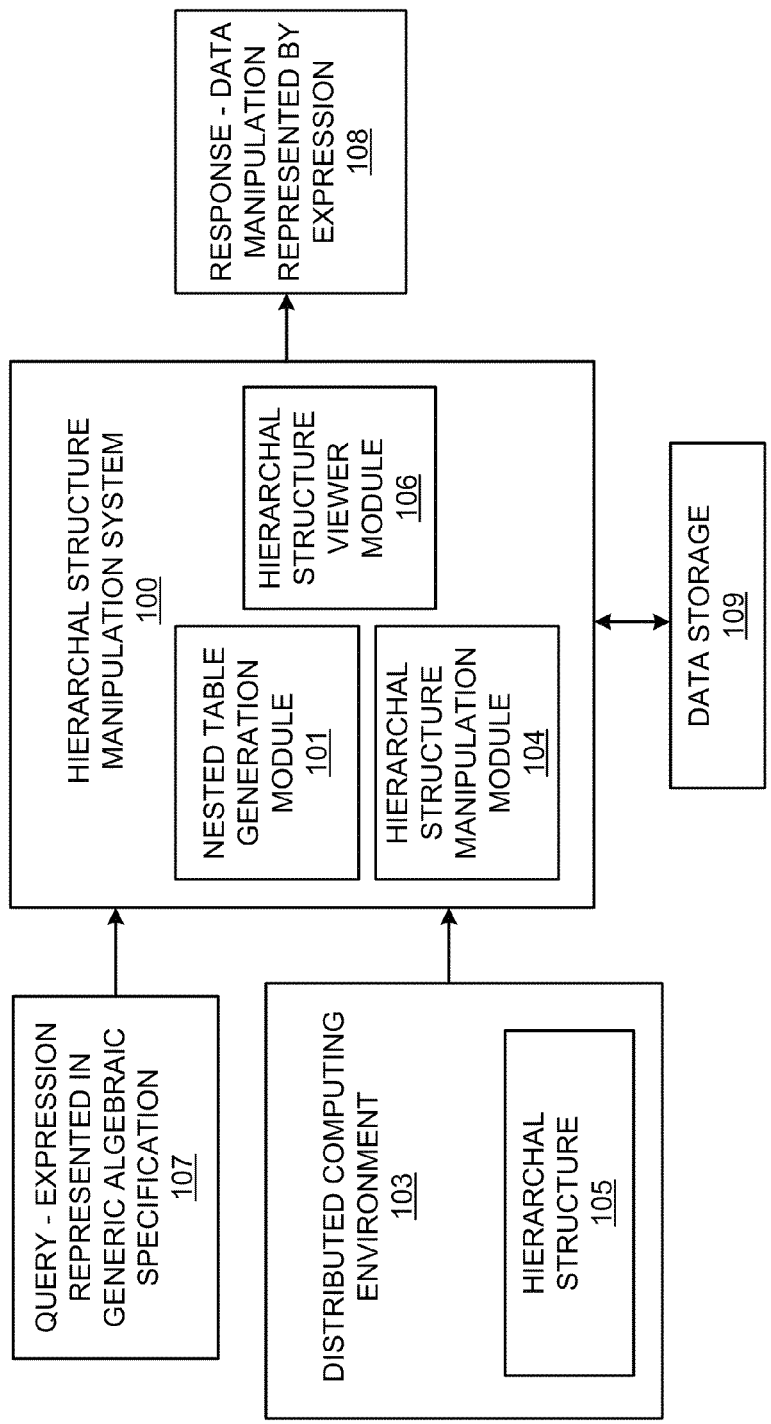
FIG. 1 illustrates a system diagram for a hierarchal structure manipulation system, according to an embodiment.

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

1. Overview

In distributed computing environments such as cloud computing and in other multi-computer computing environments generally, it can be beneficial to have a formal specification whose semantics is close to those of a group of implementation languages. Program formal specifications may be precise and defined in abstract terms without overwhelming details of canonical APIs. The specifications may be refined into concrete implementations using predefined rules. Further, formal methods may provide tools that can detect deviations of program implementations from the original specifications. The hierarchal structure manipulation system described herein provides a formal specification for hierarchical structures that may be translated into implementation in languages such as, for example, C++, C#, and Java. The hierarchal structure manipulation system may include a set of axioms for representing hierarchical structures, and provides clear and concise notations that may be translated into programming implementations.

Hierarchical structures may be defined by a set of axioms that state their properties. For hierarchal structures, an abstract syntax tree (AST) may be defined as a tree representation of an abstract syntactic structure of source code written in a programming language. An AST may differ from implementation to implementation of a parser. Each node of the tree may denote a construct occurring in the source code. A parser may analyze text, made of a sequence of tokens (e.g., words), to determine its grammatical structure with respect to a given formal grammar. The parser may be provided at a front end of a compiler. A compiler, as is conventionally known, transforms source code, which may be written in a high-level programming language, into another computer language, such as assembly or some other low-level computer language. A compiler may include the front end, a middle end and a back end. The front end may check whether a program is correctly written in terms of the programming language syntax and semantics. The front end may then generate an intermediate representation (IR) of the source code for processing by the middle end. The front end may also manage a symbol table, which may be defined as a data structure mapping each symbol in the source code to associated information such as location, type and scope. The middle end may optimize the IR, and generate another IR for the back end. The back end may be responsible for translating the IR from the middle end into assembly code.

Depending on the goals of a compiler design, an AST may carry attributes for subsequent analyses and target platform code generation. The complexity of an AST may be proportional to, for example, the number of different types of nodes multiplied by the number of different types of attributes in each node. The complexity of data structures can result in the complicated APIs that manipulate the data structures. The foregoing complexity-related factors and other factors may lead to incompatibility of different components of compilers. These factors may also lead to complexity in a rule sections of a parser, which may present difficulties during debugging and maintenance. The coupling between the programming language dependent parsing and subsequent parts, for example, semantic analysis, may also present difficulties for reusing parts of different compilers.

Applicability of the hierarchal structure manipulation system to systems that use hierarchical structures by implementing a C# parser is described below by way of example. The implementation process includes construction and manipulation of large ASTs. The hierarchal structure manipulation system addresses the foregoing and other difficulties encountered when dealing with ASTs by providing a general approach that allows for syntax-tree level API independent of a specific tree implementation.

Various techniques may be used to allow developers to compose compilers using reusable components. The ability of constituent components to interoperate may enhance the functionality of a compiler. The IR may be considered the link that provides for such interoperability. However, IRs may be language dependent, and use additional infrastructure to operate. For example, the ZEPHYR AST description language offers a grammar and tools that compiler developers may use in order to generate code that processes ASTs. Other IR implementations may offer various syntactic and semantic rules that may require extensive up-front investment from compiler developers without a clear vision of the achievement of interoperability with other components of other compilers. Known IR implementations however may not preserve the value of the original Backus Normal Form (BNF) grammar, while also facilitating mapping to the concrete language syntax. BNF may be defined as a notation technique for context-free grammars, which may be used to describe the syntax of languages used in computing. Examples of languages may include computer programming languages, document formats, instruction sets and communication protocols. For the hierarchal structure manipulation system, an example of generating an IR that addresses the foregoing and other limitations is described below, and an example based in XML is provided.

As described above, hierarchical structures may be defined by a set of axioms that state their properties. For example, a property of a XML data may state that it should have exactly one root element. Algebraic specifications may provide term rewriting that replaces a part of an equation by another part. The hierarchal structure manipulation system includes a framework that takes formal specifications of hierarchical systems and generates its implementation in a chosen language. The hierarchal structure manipulation system provides an abstraction over different canonical APIs that manipulate hierarchical systems. A front end for the hierarchal structure manipulation system may be implemented as a Hierarchal Structure Manipulation Language (HSML) that uses the facilities of polymorphism and overloading to implement an algebraic notation, denoted ASHIES (Algebraic Specification for Hierarchical Structures). In distributed computing environments such as cloud computing, and in computing environments generally, the different API calls in such environments may be buried into ASHIES. An implementation of HSML in C++ that utilizes parametric polymorphisms and C# implementation that is based on the subtype polymorphism is described below. Both implementations also use ad-hoc polymorphism for operator and method overloading to implement ASHIES.

As described in further detail below, the hierarchal structure manipulation system may include a nested table generation module to generate nested tables representing hierarchal relationships of computing systems in a distributed computing environment. A hierarchal structure manipulation module may access at least one nested table to manipulate a hierarchal structure represented by the nested table. Manipulation of a hierarchal structure may defined as any type of query or command based access, transformation or use of information in the hierarchal structure. The system may include a hierarchal structure viewer module for viewing a hierarchal structure that can be manipulated by a user. The hierarchal structure manipulation module may use a generic algebraic specification (i.e. ASHIES) to manipulate the hierarchal structure represented by the nested table. The generic algebraic specification may provide a generic abstraction across a plurality of the computing systems in the distributed computing environment.

With regard to manipulation of hierarchical structures, various notations may provide for such manipulation and may be considered languages. When a program is written using complex and difficult-to-remember APIs, this may present difficulties in analysis on the subject of code transformation with the following reduction and subsequent automation of repetitive programming tasks. The HSML may be based on an abstraction that treats tree structures as multidimensional arrays. HSML may offer a concise algebraic notation that can be turned into implementation without exposing any APIs.

In certain aspects, building an IR may be considered a mandatory step in modern compiler construction that does not have a clear algorithmic definition. Once defined, the IR influences the subsequent steps of compiler development such as code generation, optimization, etc. Therefore, it may be prudent to decide upon the form and content of IR at an early stage to avoid subsequent rewriting of compiler parts.

Code transformation and conversion tools have become more common with the proliferation of programming languages. An example of such a tool includes a tool for converting C++ into Java source code. In such tools, the real conversion strategy may be determined on the grammar level. When IR reflects the original grammar with encoded transformational dependencies, then a tool can be built that automatically generates the target language code from the IR. For each matching pair of grammar rules in both languages, a conversion strategy may be determined and then coded. The API developed to perform the conversion may be a parser tool dependent. However, each parser tool may be language dependent. For example, when LEX/YACC is used, then the parser generated code may be in C or C++. This may impose constraints on the representation of ASTs, API, and subsequently the rest of the compiler. The capability of taking an IR and feeding it into a different compiler may improve the quality of the generated code and facilitate conversion between different languages.

XML may be used as a de-facto industry standard for data exchange. XML may provide a universal format for representing any data structure, and various parsers that process XML file structures into the internal representation called DOM. Each node in the DOM may have the same datatype and may have a different number of attributes that describe its structure. In an example described below, the hierarchal structure manipulation system allows compiler developers to build a XML-based intermediate language when parsing any source language. The HSML offers a concise syntax for navigation of XML DOM. The HSML may be used to code the rule sections of parsers. Since both ASTs and XML have strictly hierarchical structures, XML-based ASTs may be built. With such an AST constructed, HSML may be used to traverse and manipulate tree elements. The HSML based approach described herein also allows for automatic generation of code for the front end of a compiler. HSML may be implemented on top of C++ and provides symbolic computational properties to manipulate hierarchical structures. The hierarchal structure manipulation system also provides for a XML-based intermediate representation (XMLIR) that improves various front-end compiler algorithms such as symbol table creation and lookup, and AST generation and traversal.

The hierarchal structure manipulation system provides significant reduction of code required to build ASTs, symbol table, and inheritance hierarchies. The hierarchal structure manipulation system also provides for defining of an IR based on a fixed sequence of steps to build a compiler front end. Instead of proposing new platform-dependent APIs, the HSML may provide parameterized uniform access to hierarchical structures with arbitrary defined types. The uniform semantics may reduce complexity of the underlying structure manipulation mechanisms and expose only the operations over explicitly defined types.

The HSML may thus provide a uniform method of accessing, analyzing and manipulating a hierarchal structure. If the structure format changes, the same HSML code may be used. By using a subset of overloaded operators for a HSMLGenericAccess class as described in further detail below, the hierarchal tree structure may be manipulated, independent of the hierarchal structure. The HSML thus provides an abstraction on top of existing function calls to thus subsume the complexity of the function calls.

2. System

Figure 2:
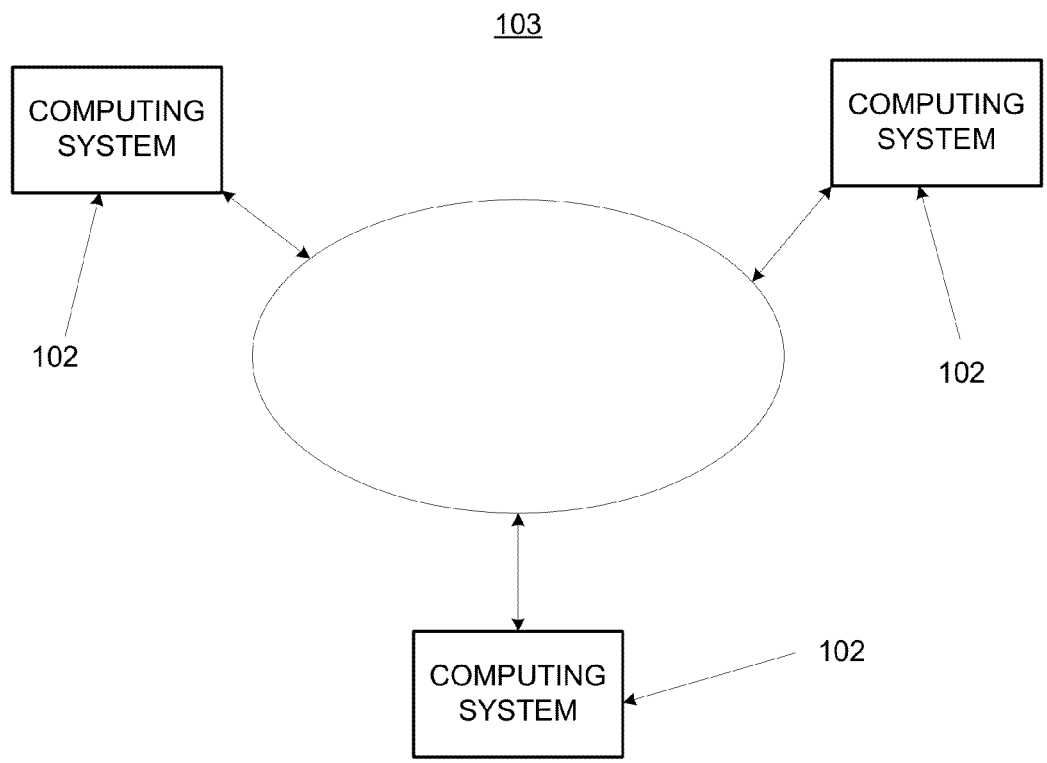
FIG. 2 illustrates a distributed computing environment, such as a cloud computing environment, for illustrating operation of the hierarchal structure manipulation system, according to an embodiment.
Figure 3:
FIG. 3 illustrates an example of nested tables, according to an embodiment.

FIG. 1 illustrates a hierarchal structure manipulation system 100, according to an embodiment. FIG. 2 illustrates a distributed computing environment 103, such as a cloud computing environment. Referring to FIGS. 1 and 2, the system 100 may include a nested table generation module 101 to generate nested tables, such as tables 120 of FIG. 3, representing hierarchal relationships of computing systems 102 in the distributed computing environment 103. The modules and other components of the system 100 may include machine readable instructions, hardware or a combination of machine readable instructions and hardware. A hierarchal structure manipulation module 104 may access one or more nested tables to manipulate a hierarchal structure 105 represented by the nested table. The hierarchal structure manipulation module may use a generic algebraic specification (i.e. ASHIES as described below) to manipulate the hierarchal structure 105 represented by the nested table. As also described below, the generic algebraic specification may provide a generic abstraction across a variety of computing systems in the distributed computing environment 103. A hierarchal structure viewer module 106 may be provided for viewing the hierarchal structure 105 that can be manipulated by a user, for example, through an editor. The hierarchal structure viewer module 106 may be used to enter a query 107, which may in the form of an expression represented in the generic algebraic specification, for manipulation of the hierarchal structure 105. As described herein, examples of different types of the hierarchal structures 105 may include structures based on XML, HTML, EDI, relational data, any type of user-defined structure, or a proprietary structure a company or organization may use. As described below, the generic algebraic specification may be generic across different computing systems and usable with different programming languages. Examples of programming languages may include C++, JAVA etc. The system 100 may generate a response 108, which may be in the form of a data manipulation represented by the expression for the query 107. A data storage 109 may be provided for storing information utilized by the system 100, which includes information for the HSMLGenericAccess class.

Algebraic Specification for Hierarchical Structures (ASHIES) is described with reference to FIGS. 1-9.

For distributed computing environments such as cloud computing, and in computing environments generally, as discussed in further detail below, ASHIES provides the generic abstraction across all types of platforms in such environments. Algebraic specifications may state operations in terms of other operations called algebraic equivalences. For example, a group of canonical APIs that move an element in a hierarchical structure under a different branch may be written as two basic operations: 'copy' the element to its new location and 'remove' the old element. These two operations may be stated as a single 'move' operation. Writing these operations as equations may provide term rewriting. For example, if equation GetElement["A"]=y means that the element that bears symbolic name A is located in a tree and its value is set to variable y, then the equation GetElement [GetElement["A"]] if y is equal to "A" may be replaced with y.

As described herein, ASHIES provides for support of intuitive syntax for facilitating programming with hierarchical structures and for facilitating translation into implementation languages. Generally, there may be a strong binding between the names of elements of hierarchical structures and their locations in computer memory. This binding may lead to strong coupling between names of variables and functions that manipulate them. For example, for an element called Salary of a hierarchical structure, a variable of float type that has name m_EmployeeSalary may be created. Subsequently, functions that manipulate this element may be referenced with names that have meaningful semantics, for example, IncreaseSalary or SetSalary. Parameters and return types of these functions may naturally depend on the type of the variable m_EmployeeSalary. If the element Salary were to be replaced with a different element called Commission that has the type integer, even though the formal specification may be readily changed, the maintenance of software for these hierarchical structures can become difficult. A developer may locate all places where the variable m_EmployeeSalary is used, replace it with a new name, and change the names and possibly parameters and return types of functions that manipulate this variable. All usage of these functions may be changed as well. This can be a manual and tedious task. A significant change in the structure of the tree and the logic that manipulates it can be even more difficult to address. Such a change may require a major rewrite of the software with little to no possibility of code reuse.

Many hierarchical structures may bind string-based names to physical representations of elements. For example, XML and HTML are examples of such structures. Each element has a name called a tag that can be assigned a value, and attributes that can also have values. An element may contain many nested elements to any level of depth. The World Wide Web Consortium (W3C) defines a model to represent hierarchical document content internally called the DOM. DOM level-2 is a specification that defines a platform- and language-neutral interface that allows programs and scripts to dynamically access and update the content, structure, and style of documents. Commercial parsers may use DOM to internally represent document content. Using DOM, software developers may access any component of a hierarchical-structured document using a standardized set of interfaces.

For example, referring to FIG. 4, an example is shown representing expression X*(Y+6/Z) using a hierarchical structure such as an AST. X, Y, and Z may be identifiers that are assigned numerical values. As shown in FIG. 4, each of the algebraic operations is described using tags, for example <multiply> for product, <sum> for addition, and <divide> for ratio of two numbers.

FIG. 5 shows a specification describing high-level algorithmic steps that find all nodes named either "Identifier" or "Number" in a XML file and verify that attribute called "Value" is present. For FIG. 5, the task is performed using a XML parser that creates a DOM representation of the file, and the specification outlines a set of operations in pseudocode. FIG. 6 shows the revised specification shown in FIG. 5 using the proposed ASHIES notation. In FIG. 6, as described herein, the nodes represent hierarchal structures and cells in nested tables as described below. FIG. 7 shows the C# class called EXPRESSIONVERIFIER that implements the specification shown in FIG. 6.

In order to facilitate programming with hierarchical structures, the system 100 uses type hiding. Generally, hierarchical structures such as XML and HTML DOM contain different data types. The inherent heterogeneousity of these structures may dictate the need for separate API calls for each type. However, since the operations performed over the nodes of different types may be similar, a HSMLGenericAccess class is provided. The HSMLGenericAccess class may address the types and implementation of hierarchical structure nodes. The relationships among nodes of different types may thus be modeled by performing an implicit conversion of their values. For example, in order to convert a XML attribute into a node while preserving its value, the details of the node and attribute structures may be omitted. This may be accomplished by writing expression x["ParentNode"]+=x["SomeNode"]("AttrNode"). The left value (l-value) of this expression may navigate to ParentNode of a structure encapsulated in instance x of the HSMLGenericAccess class. The l-value may return a reference to the instance that has an internal current node pointer set to the first node in the collection of all ParentNodes. The right value (r-value) of this expression may navigate to attribute AttrNode under SomeNode. An internal structure of this instance may keep the values of the attribute name and its value. When calling operator += the name of the attribute may be added as a new node under ParentNode and its value set to be the value of the attribute node. Since the node is moved to its new location, the attribute may be deleted after the operation is completed.

In order to write a statement, a HSMLGenericAccess type object may be written without use of any manipulation operators, such as +=. For example, the statement x["ParentNode"] allows for navigation of the internal pointer to ParentNode node encapsulated in instance x of the HSMLGenericAccess class. The internal pointers may be reset to their original values when an operation is accomplished over an instance of the class.

The HSMLGenericAccess class may also function as a smart pointer. The implementation object passed as a template parameter to this class and its internals may be accessed any time. This may be accomplished by overloading the dereferencing operator → that allows a developer to retrieve the internal objects and their operations to invoke them manually by using pointers. The HSMLGenericAccess class also provides for internal object life span management as well as all internal pointers and their memory allocation and deallocation. The reference semantics of the HSML may require that an object is shallow-copied in assignment and other situations when copying is required. The new internal object may be allocated and all pointers to the internal structures are copied. This approach is beneficial in making operations faster and occupying less memory. This approach however requires the HSMLGenericAccess class to have a reference counter that may prevent the creation of dangling pointers.

The HSML operators may be the members of the HSMLGenericAccess template class. Bracket operator [ ] may denote the access to a DOM element. For example, the bracket operator [ ] may be overloaded for the access by element name bound to a Standard Template Library (STL) type string variable and by the order number in the collection that is of integer type. For example, the STL may be defined as a software library partially included in the C++ Standard Library. The declarations of the operators in C++ are shown in FIG. 8. These operators may be overloaded to take arguments, such as integer and string as shown in FIG. 9.

The parameter class T may be a system-dependent implementation of a hierarchical structure API, for example, a DOM proprietary API. Nodes and attributes in hierarchical structures may be accessed by their names or the order number in the collection of nodes or attributes on the same level. The HSML approach may thus consider such structures as multidimensional arrays. When accessing an element, the next node may be accessed either by its name or the order number. The combination of overloaded operators [ ] may allow for access to nodes by their names and some by their order number. A DOM document may be represented as a multidimensional array and stored in a variable named "doc". For example, statement doc["body"]["section2"][2] may navigate to section 2, item 3 of the document body.

The HSMLGenericAccess class may thus provide for use of the same generic operations on data, and may be extended as needed. For example, for a new data structure, the HSMLGenericAccess class may be extended by adding to it specific data dependent manipulations for implementing the generic operations described herein.

The HSML overloaded operators are described.

The HSML may use overloaded operators +, +=, −=, <<, >>, <, >, ==, !=, <=, >= in order to provide algebraic level manipulation of tree structure elements. Operators + and += may be overloaded to take a parameter such as a string name of a node or an attribute to add to the current node. Operators + and += may also accept an instance of the HSMLGenericAccess class as a parameter. For example, if x and y represent two DOM documents, statement x["body"]["section2"][2]+=y["title"]["sub"] may mean that the subtitle for document y is copied and appended to section 2, item 3 of the body for document x. The semantics of − and −= operators may be similar to the + operators with the difference of removing nodes and attributes instead of adding them.

Stream operators may read the values of nodes and attributes and copy them into the destination variables. The stream operators may determine the type of a value automatically and perform the proper conversion. Comparison operators may allow for compact comparison semantics. For example, expression y["B"]>=3 may allow for checking to determine if there are more than three nodes named "B" in the collection of nodes under the root node of instance y. As described herein, for the HSML, a DOM representation may be treated as a multidimensional array. The array may be recursively defined as a container matrix, where E is a matrix of elements and A is a matrix of attributes, as follows:

$$\begin{bmatrix} [E] \\ [A] \end{bmatrix}$$

Each element of a matrix may be located by its name and its position number. For example, a matrix for a store element may be defined as follows:

$$\begin{bmatrix} [\text{Variable}] & [\text{Variable}] & [\text{Method}] \\ [\text{Type}] & [\text{Type}] & [\text{empty}] \end{bmatrix}$$

Based on the foregoing, referring to FIG. 22 (described in further detail below), a program may be considered as an element or a matrix that contains another element such as Class, with Class containing elements Method and Variable. The matrix may thus include elements and attributes, and may be defined recursively. For example, by accessing an element of the matrix, the element may itself include another matrix which may be accessed recursively. Each subsequently accessed matrix may include elements which may include respective matrices that may be accessed recursively.

Based on the abstraction that each element and attribute may have a value, the HSML allows parameterized access to DOM elements. The HSML may provide access to the elements of a container that is defined by both name and its order in a collection of containers. As described herein, the HSML may function as a generic library for providing access to a DOM-based data representation, with the data representation being considered a multidimensional array.

As discussed above, in distributed computing environments such as cloud computing, and in computing environments generally, ASHIES provides the generic abstraction across all types of platforms in such environments. ASHIES may function as a language and provide a method of abstraction that is universal for different computing environments. For example, for clouds such as AZURE or EC2, instead of different abstractions specific to each cloud, ASHIES provides a general abstraction that operates with any platform. The general abstraction is based on the concept of having nest tables that contain nested tables. For example, a table may include headers and each cell in the table may be a table itself with headers. For an external table, all the cells in the table may be accessed by specifying the row and the header name. Once accessed, the cell may be a table itself, which includes headers and rows. In this manner, the tables may be recursively accessed until a desired data element is reached.

Referring to FIG. 3, an example of nested tables is provided. As shown in FIG. 3, each cell may contain a table which in turn contains cells that contain other tables. Assuming a reification object (RO) represents this table, the cell at column 2 and row 2 may be accessed using the following notation, RO["Point A"][1], where "Point A" is the name of the column and 1 is the index of the row (the numbering starts with zero). The operation RO["Point A"][1] returns a table that is contained in this cell, and the cells of the nested table may be accessed using the same notation RO["Point A"][1] ["Point C"]["Point D"] returning the value 91.

The generic abstraction provided by ASHIES may thus be based on the abstraction of tables into tables. A table may be the generic abstraction of a data representation, where headers may name data and rows may specify different data entries. Every cell in the table may be another table, and the cells may be accessed by the foregoing HSML operators. The tables may also represent clusters of computers, with a first cluster of computers being a primary table, every cell in that table being a cluster including sub-clusters, with each sub-cluster being a table. In this manner, the lowest level table may represent a computer, which may have files that can be accessed to retrieve desired data element(s).

The HSML may provide parameterized uniform access to hierarchical structures with arbitrary defined types. The uniform semantics may reduce complexity of the underlying structure manipulation mechanisms and expose only the operations over explicitly defined types. The HSML may provide compositional semantics that separate the essence of the hierarchal structure manipulation problem from its complexity. The redundancy of various APIs may be hidden by HSML symbols and unified operational semantics. The HSML approach may facilitate writing of compact program specifications in the HSML for manipulating hierarchical structures that can be directly transformed into a working program.

Each hierarchical structure may be represented by a directed graph where nodes designate data types, edges determine the dependency hierarchy, and the nodes include attributes. Each attribute, as well as a node may have a value. A state of each node may be a union of its value and values of its attributes. A collection of connected nodes within a hierarchical structure may be called a branch. A branch may be a hierarchical structure itself. Examples of operations that are provided over hierarchical structures may include copy, move, remove, get value, set value, and path navigation within the structure. In order to implement these operations, the parameterized class HSMLGenericAccess is provided. A basis for this implementation is that for each hierarchical structure there exists an implementation dependent API that implements these operations. As discussed above, the parameterized class HSMLGenericAccess is declared as shown in FIG. 8.

The HSMLGenericAccess class takes the specific hierarchical structure implementation class as a template parameter and uses its methods to provide uniform access specification to the class users. The class may overload the stream operators >> and << to retrieve and set values of major primitive types. Besides the general copy constructor and assignment operator, the class may overload minus and plus operators as well as array access and functors.

An example of the HSML code to perform manipulations over a hierarchal structure, such as a XML file, is now described with reference to FIGS. 10-12.

In order to describe use of the HSMLGenericAccess class, a XML example describing a hierarchical structure is shown in FIG. 10. As shown in FIG. 10, nodes A, B, C, and D may be considered as non-terminals that map to BNF grammar. Node D has values 1 and 2. While various manipulations may be performed, such as reading/writing values, deleting/adding nodes, deleting/adding attributes, or copying branches etc., an example is provided of locating nodes D that have value 1 and attribute called Type having value "struct", and moving these nodes under the node B. The resulting XML file after performing manipulation over its structure is shown in FIG. 11. Using the HSMLGenericAccess class, an example of the HSML code to perform actions over the XML file is shown in FIG. 12.

Referring to FIG. 12, it can be seen that the HSML code does not use any proprietary API calls. The access and manipulation of the XML tree may thus be performed via the overloaded operators that accepted the custom type names as parameters. The HSML thus provides a concise program that does not require knowledge of any proprietary API, such as, the Microsoft XML DOM parser to process the data.

Based on the foregoing example, the HSML code as shown by example in FIG. 12 does not use any specific function calls that are proprietary to the data structure. For example, the HSML code does not use any XML specific data calls that would make the code specific for XML or another data structure type. Thus if the data structure were changed from XML to another hierarchal data structure such as HTML, EDI, relational data, any type of user-defined structure, or a proprietary structure a company or organization may use, the HSML code would remain the same. Based on the specific hierarchal structure, a corresponding HSMLGenericAccess class may be provided, and include the requisite low level function calls for the data structure type. The names A, B, C etc. of FIGS. 10-12 may be generic names represented using different data representations. FIGS. 10-12 thus show an example of a structure represented by a data representation (FIG. 10), manipulation thereof (FIG. 11), and the HSML code to manipulate the structure (FIG. 12).

Referring to FIGS. 13-16, examples of application of the HSML code are described for building a parser.

As an example, grammar for a calculator in YACC is described. Referring to FIG. 13, the LEX specification for recognizing tokens of double-type numbers and identifiers is shown. For the calculator expressions for the LEX specification of FIG. 13, for certain regular expressions in LEX, rule sections that create XML data types may be defined and populated with attributes. For example, for a double precision float number, a XML type named "Number" may be created and an attribute named "Value" may be added. The value of this attribute may be set as a numeric value of the token. Similar actions may be performed when a regular pattern defining identifiers is recognized. In this case, a XML type called "Identifier" may be created, and the attribute "Name" may be added to it, thus setting its value to be the identifier's recognized name.

FIG. 14 provides an example of how HSML language may be imbedded into the YACC grammar. Thus FIG. 14 shows a YACC grammar with rules for the calculator that uses HSMLGenericAccess to produce XIL. Tokens such as parenthesis may be defined because they do not include complex semantics as integer type or iValue shown in %union. Other tokens that become nodes in the parse tree may include HSMLGenericAccess<XML> type or pObj shown in %union. The rules sections of YACC grammar may include the following operations. First, a node named after the non-terminal of the rule may be created. Then the selected non-terminals and terminals of the rule designated by $n may be added as children nodes to the rule node, where n is an order number of the nonterminal or terminal of the rule. As the parser finishes to parse an expression, it may assign the top node to variable top defined in the definition section of the grammar. This variable may represent a link to the subsequent processing of the parsed tree.

Referring to FIG. 15, the XMLIR produced as a result of parsing arithmetic expression X1/(X2*(X3−5.11*(X4+8))) is shown.

Referring to FIG. 15, the grammar rules in the resulting AST are shown. By embedding grammar rules in the AST, a compiler may achieve the following benefits. For example, embedding of grammar rules facilitates trace of the paths in the AST knowing the derivations in the grammar. Further, the process of mapping grammar rules to an AST may also be automated since a developer does not need to think about what API to use for a specific rule.

Figure 16:
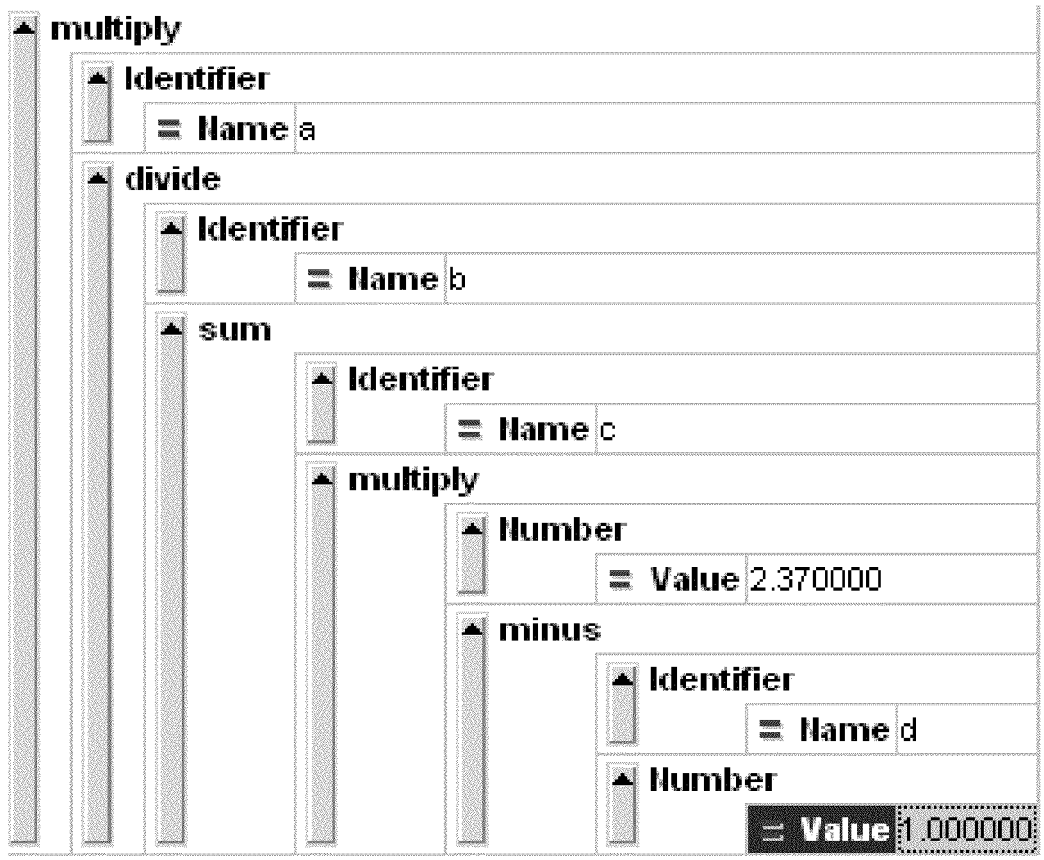
FIG. 16 illustrates an example of a XIL parse tree presented by XML SPY, according to an embodiment.

In order to illustrate the XIL data as a visible parse tree graph, an editor, such as XML SPY, that uses eXtensible Stylesheet Language Transformations (XSLT) transformation properties, may be used. Referring to FIG. 16, a visual presentation of a XIL parse tree provided by XML SPY is shown.

An example of building a symbol table using the HSML-based approach is described.

A compiler may include a symbol table as a central data structure. The symbol table may hold information on program identifiers with their attributes, such as types and initial values. The symbol table may be created by traversing an AST and harvesting all related information from its nodes. The HSML-based approach may be used to accomplish tasks in building a symbol table. In the FIGS. 13-16 expression calculator example, variables may be freely defined in an expression. However, the variables may be assigned values in order to evaluate the expression. An example of a technique for accomplishing this may be to traverse the XMLIR tree and find all nodes of type "Identifier" that do not have attribute Value. Once such a node is found, a user of the calculator may be requested to supply a value for a variable. However, the same variable may be encountered many times in an expression. Thus all distinct variables in a symbol table may be listed and referenced on an as needed basis.

The algorithm for creation of a symbol tree from XIL using HSML is shown in FIG. 17. Referring to FIG. 17, function CreateSymbolTree may take two parameters of HSMLGenericAccess type. The first parameter xir may contain XMLIR representation of a parsed source program and second parameter st may contain the resulting symbol table. The for-loop may create an integer variable i that serves as an iterator through the nodes of xir. A node i of xir may be retrieved and assigned to a temporary variable branch of HSMLGenericAccess type. The node may be checked to determine if it is an "Identifier" type node. If it is not, then CreateSymbolTree may be recursively called to process the children of the current node. Otherwise, the "Name" attribute of the "Identifier" type node may be retrieved, and checked to determine if this entry already exists in the symbol table. If it does not exist, then a user may be prompted to enter a numeric value for this identifier, with the value being set to the "Value" attribute of the node, and then added to the symbol table. Referring to FIG. 17, it can be seen that the algorithm does not use any proprietary API to manipulate the AST. Furthermore, the description is formal and may be readily fed into various verification tools to check for correctness.

Aggregated containment levels are described with reference to FIGS. 18-21.

As discussed above with reference to FIG. 17, it was assumed that the key used for symbol table lookup was the identifier. In modern programming languages, the same name may be used to refer to multiple objects within the same program. A containment level is the textual region of the program in which a binding of an identifier to its name is active. A complex form of a program may contain aggregated containment levels. When the original grammar defines aggregated containment levels, the process that builds a symbol tables may become complicated. The resulting AST may be traversed a number of times in order to determine all containment level dependencies among the nodes. The implementation thus magnifies the complexity created by a hierarchical structure traversal API. One aspect of the approach described herein for creating a symbol table with aggregated containment levels may be that the information about the aggregated containment levels is embedded in the original grammar, and is extracted during traversal of the XMLIR with initial information about the containment levels of rules and dependencies.

Figure 18:
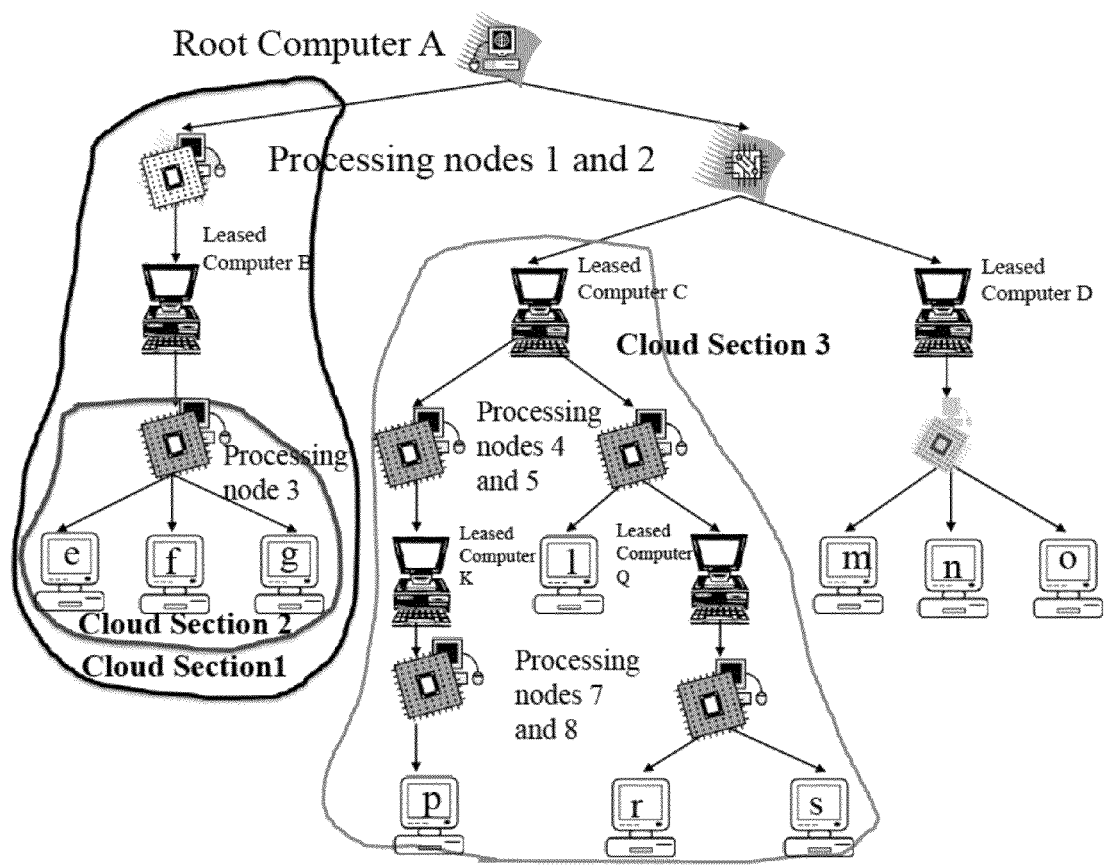
FIG. 18 illustrates a grammar derivations graph depicting containment level dependencies, according to an embodiment.

Referring to FIGS. 18 and 19, an example of a directed graph representation and its grammar are respectively shown. A directed graph may be defined as a pair G=(V,A) of a set V, whose elements are called vertices or nodes, and a set A of ordered pairs of vertices, called arcs, directed edges, or arrows. Referring to FIGS. 18 and 19, the top node A may designate the top containment level. As shown in FIG. 18, root computer A may communicate with either leased computer B or leased computer C and leased computer D. Leased computer B may communicate with processing nodes e, f and g. Leased computer C may communicate with either leased computer K or processing nodes I and Q. Leased computer D may communicate with processing nodes m, n and o. Leased computer K may communicate with processing node p. Further, leased computer Q may communicate with processing node r and s.

Referring to FIGS. 18 and 19, the algorithm thus shows how different aggregated containment levels may be accessed using the implementation of ASHIES and the generic operators to obtain different containment levels and navigate generic hierarchal structures. The algorithm thus provides an example of traversing trees and accessing data with different containment levels, and linking nodes that are allocated on different platforms. The nodes of FIG. 18 may also represent data in different formats. The algorithm is thus generic and may be used to access any type of data located on cloud computing or other platforms on any different nodes in different formats. FIG. 18 thus provides an example of representation of such nodes.

An example of the resulting symbol table is shown in FIG. 20. The name of each containment level may become a node in the resulting XMLIR symbol table. The aggregated containment levels may become children nodes under the XMLIR node of the parent containment level. An example may be if node f is a name of a class that contains method r that returns type void and contains internally defined variables internalvariable1, internalvariable2, and so forth. Instead of keeping a running count of block numbers or using similar processes, the hierarchy may be navigated when looking for a certain level of containment level or its name. Once it is found, all containment level identifiers may be found by getting the list of child nodes.

The algorithm for building a symbol table containing aggregated containment levels from XMLIR is shown in FIG. 21. The symbol table that is implemented as an instance of HSMLGenericAccess class may be initialized. Since XML files may have only one root node, the root node may be created during the initialization step. The XMLIR tree may also be initialized by setting its root node to be the current node. As shown in FIG. 21, the BUILDSCOPES function may be recursively called that takes a reference to a XMLIR node as its first parameter and a reference to the symbol table.

Application for HSML for generic cloud computing is described with reference to FIGS. 22 and 23.

In an example, a process of the HSML operating with XML may be modeled as the progression of an order as it moves from the top of the tree to its leaves. If a XML file contains information about a parsed program in XMLIR, then the information model may describe the classes, class methods and variables. The HSML may operate with types of data as opposed to instances of data.

Referring to FIG. 22, an example is illustrated of a schematic 200 of a hierarchal structure, which in this example is a tree structure describing grammar production rules. The schematic 200 may include XML elements 201 including element attributes 202. For the particular example of FIG. 22, the schematic 200 may also include a top element called Program that is not necessarily the root of a XML file, and a child element called Class. Additional elements and attributes may be provided. Each Class element may include child elements called Methods and Variables. The relationship between the parent element and the child element may be shown with an arrow 203 directed from the parent to the child. Each element may include additional elements of the same type and on the same level.

In order to manipulate the FIG. 22 structure, a developer may consider finding all variables with a certain type declared in a class. For example, if MICROSOFT XML (MSXML) parser is used to parse the XML file into DOM, then a set of operations in pseudocode is shown in FIG. 23. The DOM may be defined as a cross-platform and language-independent convention for representing and interacting with objects in HTML, eXtensible HyperText Markup Language (XHTML)

and XML documents. Aspects of the DOM (e.g. elements) may be addressed and manipulated within the syntax of the programming language in use. Each line of the pseudocode may require developers to write a substantial amount of code. Manipulation of XML data may include, for example, the following operations on elements and attributes: path navigation, copying, moving, adding, removing, and setting and retrieving their values. XSLT and XPath may not remove the need for writing code that initializes XML documents and copies elements. As described herein, for the HSML, a DOM representation may be treated as a multidimensional array. The array may be recursively defined as a container matrix, where E is a matrix of elements and A is a matrix of attributes, as follows:

$$\begin{bmatrix} [E] \\ [A] \end{bmatrix}$$

Each element of a matrix may be located by its name and its position number. For example, a matrix for a store element may be defined as follows:

$$\begin{bmatrix} [\text{Variable}] & [\text{Variable}] & [\text{Method}] \\ [\text{Type}] & [\text{Type}] & [\text{empty}] \end{bmatrix}$$

Based on the foregoing, referring to FIG. 22, a program may be considered as an element or a matrix that contains another element such as Class, with Class containing elements Method and Variable. The matrix may thus include elements and attributes, and may be defined recursively. For example, by accessing an element of the matrix, the element may itself include another matrix which may be accessed recursively. Each subsequently accessed matrix may include elements which may include respective matrices that may be accessed recursively.

Based on the abstraction that each element and attribute may have a value, the HSML allows parameterized access to DOM elements. The HSML may provide access to the elements of a container that is defined by both name and its order in the collection of containers. As described herein, the HSML may function as a generic library for providing access to a DOM-based data representation, with the data representation being considered a multidimensional array.

Semantics of the HSML are described.

The HSML may provide for support of intuitive syntax for facilitating programming with hierarchical structures, and allow extensions to facilitate incorporation into the language structure. Generally, hierarchical structures such as XML and HTML DOM contain different data types. The inherent heterogeneousity of these structures may dictate the need for separate API calls for each type. However, since the operations performed over the nodes of different types may be similar, the parameterized HSMLGenericAccess class is provided. The HSMLGenericAccess class may address the types and implementation of hierarchical structure nodes. The relationships among nodes of different types may thus be modeled by performing an implicit conversion of their values. For example, in order to convert a XML attribute into a node while preserving its value, the details of the node and attribute structures may be omitted. This may be accomplished by writing expression x["ParentNode"]+=x["SomeNode"]("AttrNode"). The left value (l-value) of this expression may navigate to ParentNode of a structure encapsulated in instance x of the HSMLGenericAccess class. The l-value may return a reference to the instance that has an internal current node pointer set to the first node in the collection of all ParentNodes. The right value (r-value) of this expression may navigate to attribute AttrNode under SomeNode. An internal structure of this instance may keep the values of the attribute name and its value. When calling operator += the name of the attribute may be added as a new node under ParentNode and its value set to be the value of the attribute node. Since the node is moved to its new location, the attribute may be deleted after the operation is completed.

As described above, in order to write a statement, a HSMLGenericAccess type object may be written without use of any manipulation operators, such as +=. For example, the statement x["ParentNode"] allows for navigation of the internal pointer to ParentNode node encapsulated in instance x of the HSMLGenericAccess class. The internal pointers may be reset to their original values when an operation is accomplished over an instance of the class.

The HSMLGenericAccess class also functions as a smart pointer. The implementation object passed as a template parameter to this class and its internals may be accessed any time. This may be done by overloading the dereferencing operator → that allows a developer to retrieve the internal objects and their operations to invoke them manually by using pointers. The HSMLGenericAccess class provides the internal object lifespan management as well as all internal pointers and their memory allocation and de-allocation. The reference semantics of the HSML may require that an object is shallow-copied in assignment and other situations when copying is required. The new internal object may be allocated and all pointers to the internal structures may be copied. This approach may be beneficial in making operations faster and occupying less memory. This approach however requires the HSMLGenericAccess class to have a reference counter that may prevent the creation of dangling pointers.

Operators [ ] and ( ) of the HSMLGenericAccess class are described.

The operators [ ] and ( ) may be the members of the HSMLGenericAccess template class. Bracket operator [ ] may denote the access to a DOM element. For example, the bracket operator [ ] may be overloaded for the access by element name bound to a STL type string variable and by the order number in the collection that is of integer type. The declarations of the operators in C++ are shown in FIG. 8. The operators may be overloaded to take arguments of two types: integer and string. For example, the STL may be defined as a software library partially included in the C++ Standard Library. The parameter class T may be a system-dependent implementation of a hierarchical structure API, for example, a DOM proprietary API. As discussed above, nodes and attributes in hierarchical structures may be accessed by their names or the order number in the collection of nodes or attributes on the same level. The HSML approach may thus consider such structures as multidimensional arrays. When accessing an element, the next node may be accessed either by its name or the order number. The combination of overloaded operators [ ] may allow for access to nodes by their names and some by their order number. As discussed above, a DOM document may be represented as a multidimensional array and stored in a variable named "doc". For example, statement doc["body"]["section2"][2] may navigate to section 2, item 3 of the document body.

An example of an application of using HSML to build parsers, such as a C# parser, is described with reference to FIG. 24.

Figure 24:
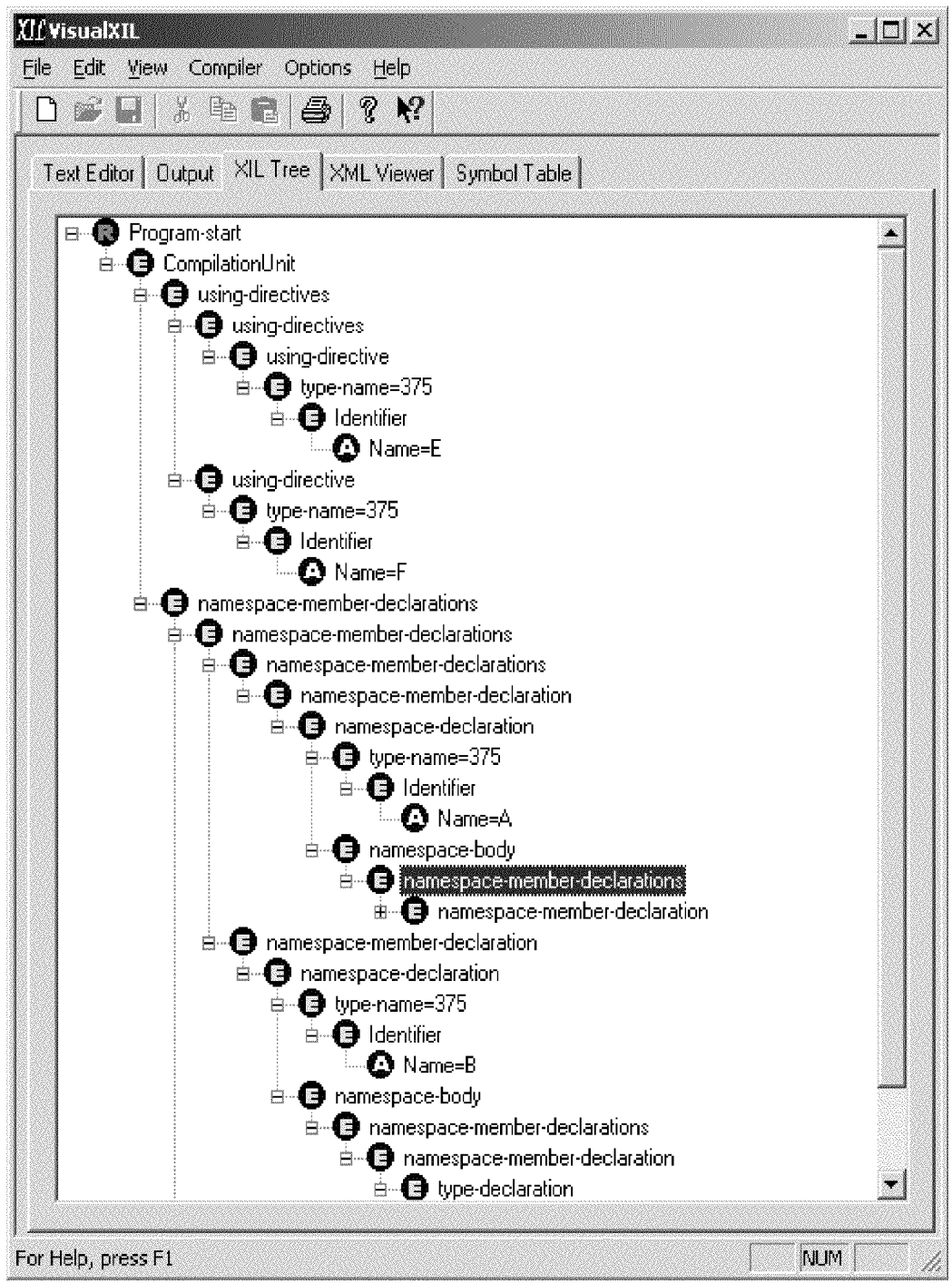
FIG. 24 illustrates front end of the tool that allows for browsing XMLIR and a symbol table data, according to an embodiment.

Referring to FIG. 24, the HSML approach may be used to build parsers, such as a C# parser. The use of XMLIR processes may reduce the compiler design and development time. The C# parser may be built by implementing a context-free grammar of the full set of C# with the exception of unsafe code and preprocessor directives. As a starting point, user-consumption grammar rules may be used. The HSML approach as described herein may also be used to build code-dependent editors. With XMLIR as a starting point, a tool may be built for providing the visual representation of XMLIR and a symbol table. Referring to FIG. 24, the front end of the tool that provides for browsing XMLIR and symbol table data is shown.

The HSML code 105 may thus provide a uniform method of accessing and manipulating hierarchal structures, such as the XML structure of FIG. 10. If the structure format changes, the same HSML code may be used, as described above for the example for FIGS. 10-12. Data may be accessed in a standard manner as information access using multidimensional arrays. By using a subset of overloaded operators for the HSMLGenericAccess class as described above, the hierarchal tree structure may be manipulated, independent of the hierarchal structure. As also described above, HSML may also provide a generic hierarchal structure by providing a uniform way to represent the hierarchal structure. The generic hierarchal structure may also be adjusted to the facilities of an existing language. For example, by using the HSMLGenericAccess class, facilities of an existing programming language may be used. Thus when using existing syntax, an existing compiler may be leveraged. For example, by introducing the HSMLGenericAccess class in C++ or C# (or another programming language), data access and syntax may be implemented, and semantics may, be applied without developing a language extension. By using facilities of an existing programming language, the implementation may function as a library as opposed to a programming language. By providing a generic hierarchal structure, a holistic view of a multi-language system may be obtained, regardless of the programming language used to implement the system.

3. Method

Figure 25:
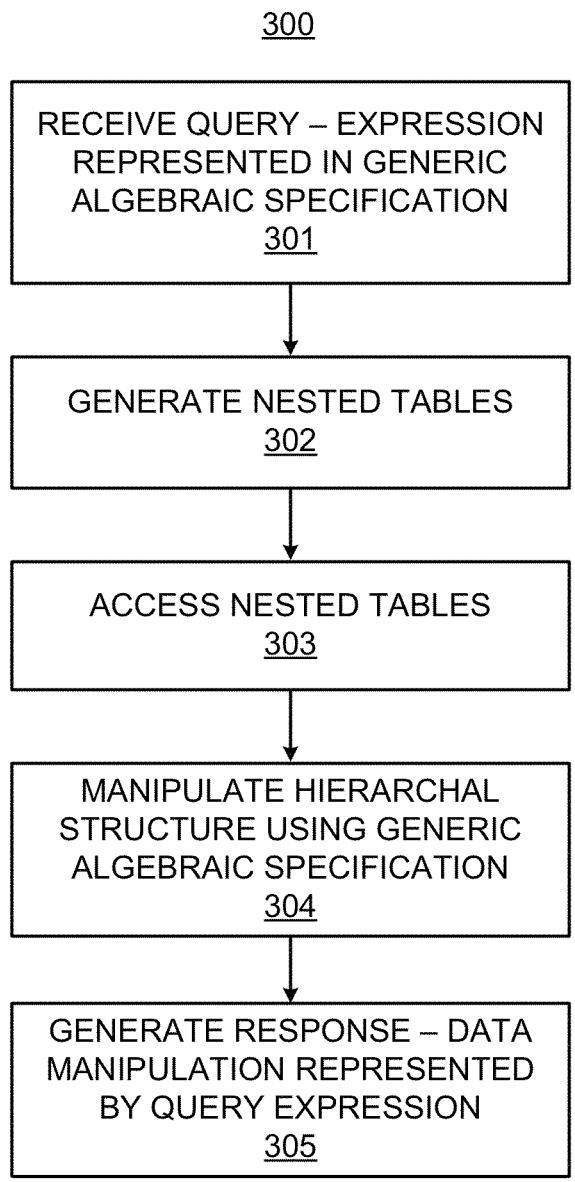
FIG. 25 illustrates a method for manipulating a hierarchal structure, according to an embodiment.

FIG. 25 illustrates a flowchart of a method 300 for manipulating the hierarchal structure 105, according to an embodiment. The method 300 may be implemented on hierarchal structure manipulation system 100 described above with reference to FIGS. 1-24 by way of example and not limitation. The method 300 may be practiced in other systems.

At block 301, the system 100 may receive the query 107 from a user for manipulation of the hierarchal structure 105. The query 107 may be in the form of an expression represented in the generic algebraic specification (i.e. ASHIES). Alternatively, the system 100 may convert the query by the user to an appropriate generic algebraic specification as described above. As described above, for the hierarchal structure 105, hierarchical organizations of data may be represented and manipulated by systems, such as, file systems, database schemas, compilers, eXtensible Markup Language (XML), HyperText Markup Language (HTML), Electronic data interchange (EDI), relational data, any type of user-defined structure, or a proprietary structure a company or organization may use. As also described above, the generic algebraic specification may use overloaded operators that are members of the HSMLGenericAccess class.

At block 302, the system 100 may generate nested tables representing hierarchal relationships of the computing systems 102 in the distributed computing environment 103. As described above, the distributed computing environment 103 may be a cloud computing environment.

At block 303, the system 100 may access at least one nested table representing the hierarchal structure 105 from the set of nested tables.

At block 304, the system 100 may manipulate the hierarchal structure 105 by using the generic algebraic specification. As described above, the generic algebraic specification ASHIES may also provide a generic abstraction across the computing systems 102. ASHIES may also provide a generic abstraction across programming languages in the distributed computing environment.

At block 305, the system 100 may generate the response 108, which may be in the form of a data manipulation represented by the query expression.

4. Computer Readable Medium

Figure 26:
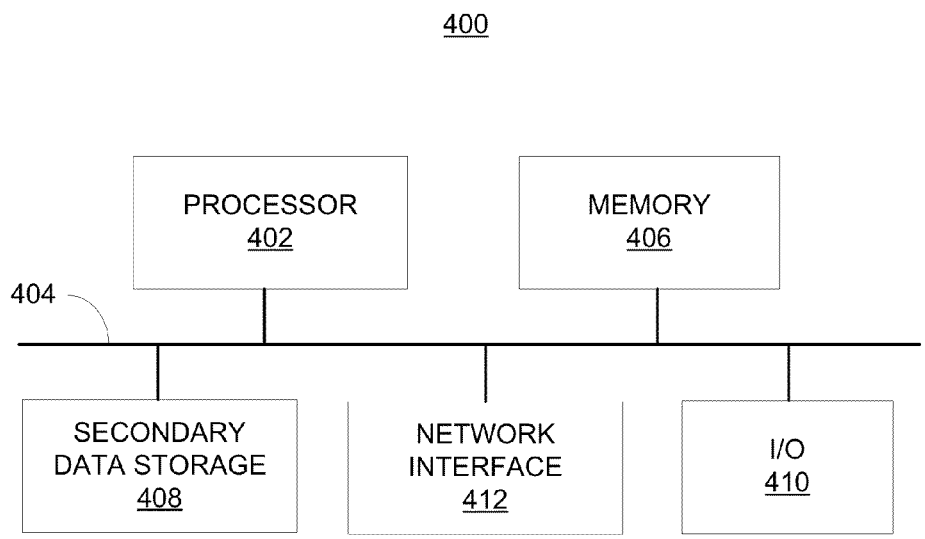
FIG. 26 illustrates a computer system, according to an embodiment.

FIG. 26 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A method for manipulating a hierarchal structure, the method comprising:
generating nested tables representing hierarchal relationships of computing systems in a distributed computing environment;
receiving a query, by a hierarchical structure viewer, in a form of an expression represented in a generic algebraic specification that is independent of different programming languages for manipulating the hierarchal structure;
accessing, based on the query, at least one nested table representing the hierarchal structure from the nested tables representing the hierarchal relationships of the computing systems in the distributed computing environment;

manipulating, by a processor, the hierarchal structure represented by the nested table by using the generic algebraic specification that provides a generic abstraction across a plurality of the computing systems and across a plurality of the different programming languages in the distributed computing environment, wherein the manipulation comprises using an abstract syntax tree (AST) level application programming interface (API) that is independent of a programming language specific AST implementation; and generating a response to the query based on the manipulation of the hierarchal structure.

2. The method of claim 1, wherein the distributed computing environment is a cloud computing environment.

3. The method of claim 1, wherein the hierarchal structure is a XML-based structure.

4. The method of claim 1, wherein the hierarchal structure is a user-defined structure.

5. The method of claim 1, further comprising using overloaded operators that are members of a generic class, wherein the overloaded operators perform the manipulation of the hierarchal structure based on the generic algebraic specification.

6. The method of claim 1, further comprising:

modeling relationships between different types of nodes of the hierarchal structure by omitting details of attribute structures related to the nodes.

7. The method of claim 1, wherein accessing the at least one nested table further comprises:

determining a name and order number associated with nodes and attributes in the hierarchical structure, and accessing the nodes and attributes in the hierarchical structure by the name or the order number.

8. The method of claim 1, further comprising:

representing a document object model (DOM) representation of the hierarchal structure as a multidimensional array;

recursively defining the multidimensional array as a container matrix including at least one matrix of elements and at least one matrix of attributes; and recursively accessing the elements of the at least one matrix of elements.

9. The method of claim 1, further comprising:

using the nested tables to represent clusters of the computing systems in the distributed computing environment.

10. The method of claim 1, further comprising:

using a primary table of the nested tables to represent a cluster of the computing systems in the distributed computing environment; and using cells of the primary table to represent sub-clusters of the computing systems in the distributed computing environment.

11. A hierarchal structure manipulation system comprising:

a nested table generation module, executed by a processor, to generate nested tables representing hierarchal relationships of computing systems in a distributed computing environment;

a user interface to receive a query in a form of an expression represented in a generic algebraic specification that is independent of different programming languages for manipulating a hierarchal structure; and a hierarchal structure manipulation module to:

access, based on the query, at least one nested table to manipulate the hierarchal structure represented by the nested table, use the generic algebraic specification to manipulate the hierarchal structure represented by the nested table, wherein the generic algebraic specification provides a generic abstraction across a plurality of the computing systems and across a plurality of the different programming languages in the distributed computing environment, and use an abstract syntax tree (AST) level application programming interface (API) that is independent of a programming language specific AST implementation, wherein the user interface is to further generate a response to the query based on the manipulation of the hierarchal structure.

12. The system of claim 11, wherein the distributed computing environment is a cloud computing environment.

13. The system of claim 11, wherein the hierarchal structure is a XML-based structure.

14. The system of claim 11, wherein the hierarchal structure is a user-defined structure.

15. The system of claim 11, wherein the generic algebraic specification uses overloaded operators that are members of a generic class, and wherein the overloaded operators perform the manipulation of the hierarchal structure based on the generic algebraic specification.

16. The system of claim 11, wherein the generic algebraic specification is capable of providing the generic abstraction across all computing systems in the distributed computing environment.

17. A non-transitory computer readable medium having stored thereon a computer executable program to manipulate a hierarchal structure, the computer executable program when executed causes a computer system to:

generate nested tables representing hierarchal relationships of computing systems in a distributed computing environment;

receive a query, by a hierarchical structure viewer, in a form of an expression represented in a generic algebraic specification that is independent of different programming languages for manipulating the hierarchal structure;

access, based on the query, at least one nested table representing the hierarchal structure from the nested tables representing the hierarchal relationships of the computing systems in the distributed computing environment; and manipulate, by a processor, the hierarchal structure represented by the nested table by using the generic algebraic specification that provides a generic abstraction across a plurality of the computing systems and across a plurality of the different programming languages in the distributed computing environment, wherein the manipulation comprises using an abstract syntax tree (AST) level application programming interface (API) that is independent of a programming language specific AST implementation; and generate a response to the query based on the manipulation of the hierarchal structure.

18. The non-transitory computer readable medium of claim 17, further comprising using overloaded operators that are members of a generic class, wherein the overloaded operators perform the manipulation of the hierarchal structure based on the generic algebraic specification.

* * * * *